US009465588B1

(12) United States Patent  
Lam (10) Patent No.: US 9,465,588 B1  
(45) Date of Patent: Oct. 11, 2016

(54) USER PROGRAMMABLE TOY SET (76) Inventor: Peter Ar-Fu Lam, Torrance, CA (US)

( * ) Notice: Subject to any disclaimer, the term of this patent is extended or adjusted under 35 U.S.C. 154(b) by 2606 days.

(21) Appl. No.: 11/041,048

(22) Filed: Jan. 21, 2005

(51) Int. Cl.  
*G06F 9/44* (2006.01)
(52) U.S. Cl.  
CPC ........................... *G06F 8/34* (2013.01)
(58) Field of Classification Search  
None  
See application file for complete search history.

(56) References Cited

U.S. PATENT DOCUMENTS

| | | | | |
|---|---|---|---|---|
| 4,923,428 A | * | 5/1990 | Curran | 446/175 |
| 5,083,968 A | * | 1/1992 | Hart | 446/431 |
| 5,314,336 A | * | 5/1994 | Diamond et al. | 434/169 |
| 5,724,074 A | * | 3/1998 | Chainani et al. | 345/474 |
| 5,850,628 A | * | 12/1998 | Jeffway, Jr. | 704/258 |
| 6,012,961 A | * | 1/2000 | Sharpe et al. | 446/298 |
| 6,364,735 B1 | * | 4/2002 | Bristow et al. | 446/397 |
| 6,542,925 B2 | * | 4/2003 | Brown et al. | 709/208 |
| 6,546,436 B1 | * | 4/2003 | Fainmesser et al. | 710/5 |
| 6,879,862 B2 | * | 4/2005 | Brown et al. | 700/17 |
| 6,902,461 B1 | * | 6/2005 | Munch et al. | 446/91 |
| 8,287,327 B1 | * | 10/2012 | Ghaly | 446/297 |
| 2001/0034559 A1 | * | 10/2001 | Brown et al. | 700/17 |
| 2003/0135294 A1 | * | 7/2003 | Lam | 700/94 |
| 2013/0244531 A1 | * | 9/2013 | Atsmon et al. | 446/175 |

OTHER PUBLICATIONS

Easy Format Website, retrieved from <http://easyformat.com>, 1999.*  
Grow With Me, Inc. "Easy FormatTM", Dec. 3, 2001, pp. 1-20 [online][retrieved on Sep. 13, 2014, retrieved from: <http://web.archive.org/web/20011203043927/http://easyformat.com/>.*

* cited by examiner

*Primary Examiner* — Evral E Bodden (57) ABSTRACT

A user programmable toy set comprising a master toy member; a microcontroller; a group of transducers and sensors, a software compiling program, a web site are provided to support users to program an interactive toy.

20 Claims, 10 Drawing Sheets

|  | Pin1 | Pin2 | Pin3 | Pin4 | Pin5 | Pin6 | Pin7 | Pin8 |
|---|---|---|---|---|---|---|---|---|
| I/O State# 0: | R:E1 | R:E2 | R:E3 | R:E4 | X | X | X | X |
| I/O State# 1: | F:E11 | R:E2 | R:E3 | R:E4 | X | X | X | X |
| I/O State# 2: | R:E1 | F:E11 | R:E3 | R:E4 | X | X | X | X |
| I/O State# 3: | R:E1 | R:E2 | F:E11 | R:E4 | X | X | X | X |
| I/O State# 4: | R:E1 | R:E2 | R:E3 | F:E11 | X | X | X | X |

Fig. 1A

| EVENT#1: | STATE# 1; SOUND# 1; EVENT# 1 |
|---|---|
| EVENT#2: | STATE# 2; SOUND# 2; EVENT# 2 |
| EVENT#3: | STATE# 3; SOUND# 3; EVENT# 3 |
| EVENT#4: | STATE# 4; SOUND# 4; EVENT# 4 |
| EVENT#11: | STATE# 0; END |

USER PROGRAMMABLE TOY SET

FIELD OF THE INVENTION

The present invention relates to a user programmable toy set that enables a user to program a toy article making use of a microcontroller for providing different personality and different play pattern for the toy article.

BACKGROUND OF THE INVENTION

Traditional programmable systems require user to learn the detail technical structure about a microcontroller, assembly language to program the microcontroller and the design of supporting electronics circuit. Assembly language is extremely difficult for beginners to handle and debug. Supporting circuit design such as LCD display also requires in depth knowledge of electronics design skill. It is the objective of this invention to provide a toy set that allows a nonprofessional user to learn and start trying to program a toy article with a user friendly programming language Easy Format, previously invented by the applicant.

SUMMARY OF THE INVENTION

It is the intention of this invention to provide a programmable toy set suitable to be programmed by children. This solution is supported with a programming method invented by the applicant as disclosed in U.S. Pat. No. 5,867,818, named Easy Format in the trade. Easy Format compiling program is an established event driven programming method very suitable for users without any engineering background because users are not required to learn the assembly language instructions of a microcontroller. Programming methods, programming languages or software compiling programs, are very different in nature as compared with traditional software programs as they are tools provided for users to write traditional software programs. A software compiling program has variable precomputer and post computer activities depend on the nature of the program to be written with this tool. When compared with assembly language and other high level programming language such as C and Java, programs written in Easy Format are very easy to be read and interpreted by other programmers, make it a programming language of choice for children to share and discuss software programs with other children or mentors. When compared with two dimensional flow chart type of programming languages, Easy Format is superior because it provides means to structure multiple dimensions program flow with just two to three tables. Programming with the new improved Easy Format compiling software is simply a job of filling up tables elements according to the program flow structured inside the mind of the user.

Since the traditional form of Easy Format has already become an industrial standard and reference instructions had been published by U.S. Pat. No. 5,867,818 and many Easy Format licensees in the public domain, further in depth description of the earlier, traditional Easy Format software is not provided in detail in this application. In summary, Easy Format is a programming language, or a programming method that enables a user to program a microprocessor IC or a controller unit to interact with external circuitry. This programming software is defined to comprise the following programming steps:

(a) defining m input channels for said controller unit to receive external data or signals, wherein m is an integer equal or greater than one;

(b) defining n output channels for said controller to transmit data or signals, wherein n is an integer equal or greater than one;

(c) specify x configuration state, wherein each configuration state defines the configuration of at least one input channel and/or one output channel and x is an integer equal or greater than one;

(d) specify y events to be executed by said controller unit, wherein y is an integer equal or greater than one;

(e) specify an event to be executed when the signal or data received by an input channel satisfied a predefined qualifying condition and (f) enable an event to switch from a current configuration state to another configuration state.

Significant improvements to the traditional Easy Format programming method are introduced in this patent application to support the special application of programmable toys for children. These improvements make use of enhanced interactive visual features of computer screen or the windows environment to minimize programming labor and errors. User-friendly symbols and graphic labels related to the specific programmable toy are added on a computer screen to facilitate composing an Easy Format program. The programming process is further enhanced by providing very special pull down menu and drag and drop features customized according to the nature of the Easy Format programming method. Special new instructions are added for the microcontroller to handle typical toy components such as motors, LED, light bulbs, directly sending message to display on LCD panels and controlling interface/protocol for a toy article to communicate with a remote terminal or web site. Most push button keys of a remote controller provided in this system is user programmable and therefore a label area can be added for the user to define the nature of the input keys.

Although it is disclosed a preferred embodiment for a user to program the Easy Format program at a computer and then transfer the executable code to a flash memory for use by a microcontroller, various methods of downloading the executable code to the microcontroller known to the industry is considered to be within the scope of this invention.

It is the objective of this invention to provide a programmable toy system that can be easily handled by nonprofessional users. An improved version of East Format software compiler is discussed herein to enable a user without any technical know how to program a toy according to his/her imagination and desire. The programmable toy system can be provided in many different forms of toy articles, including but not limited to dolls, male action figures, robots, motor vehicles, race tracks, play sets, and games. Characteristics of a programmable toy article are the structure of the sensors and transducers connected to a microcontroller provided inside a toy member. The microcontroller inside the toy is then programmed to active the transducers according to the signals received from the sensors. Typical examples of the sensors are motion sensors such as motors and solenoids; position sensors; different kinds of switches; sound sensors such as condenser microphone and light sensors. Typical examples of transducers are heat transducers; light transducers such as light bulbs and LEDs, LCD displays; sound transducers; and motion transducers. A programmable toy may also be equipped with computer interface circuits and possibly a modem or dialing circuit for the toy to communicate with a remote phone or a web site without hooking up with a computer.

The toy is also preferred to equip with wired or wireless designs of identification circuits for a master programmable member to interface with a family of accessory toy members. In another preferable design, a keypad such as a numeric keypad is provided on top of a programmable toy article to provide interactive responses or to direct different play modes by the users after the toy article is programmed. A numeric keypad carries a special meaning to the toy, it allows the toy to be programmed with high number of operation modes and also allow the user to design the toy with activities involving numbers such as a function to activated or locked with special sequence of codes. The programmable toy is also preferred to be equipped with a remote controller for the user to control the toy remotely, and also enabling the user to override a preprogrammed sequence remotely when desired.

Most programmable toys promoted in the market are not really programmable toys. The different play patterns provided by the toy are actually preprogrammed in the factory. The user is only permitted to select one of the preprogrammed play modes. Another type of programmable toys allows the user to select a series of preprogrammed functions. These types of programmable toys are actually sequence controllers and not a real user programmable toy as defined in this application. A user program defined in this application requires the user to access to a software compiler, write or compose a program and then to compile the program into codes executable by the microcontroller of the toy. The compiled code of a user program is either downloaded direction into the toy or transferred into a memory module or cartridge, and then for the memory module to be connected to the toy for the execution by the microcontroller inside.

The toy company providing the programmable toy product line is recommended to provide a supporting web site. With this web site, a user may obtain interactive support from a remote help desk to use the system or to compose a user program. Remote help desk for user programming had not been successful because most programs written in assembly language and even high level languages such as C and Java are very difficult to be understood by a third party. Since Easy Format is now such a user friendly programming language, that most people can understand the program flow defining the operation of a program easily, the remote help desk concept to support user programming now makes sense.

In another application example, the user may exchange programs written by other people through different remote fan club web sites and the web site supported by the toy company. Although the toy company and other users may post application programs on the web sites, the user friendly nature of Easy Format enables a user to modify or fine tune a program, and to replace a program with some personalized sound files or messages before it is down loaded into the toy.

In another business model, a toy company selling a programmable doll product line may release one version of application software every week or every month. Each version will give the doll a different personality. In this case a user obtains a different doll every month, or even every week. Since the memory size equipped inside the doll to store program code and compressed digital data representing sound files are always limited, another exciting feature can be provided for this business model by posting a large library of voice messages for each doll on the web site to support a new code release. Another business model allowed by this toy invention is for the user to post their own program on the website for exchange or share with other users. A user may also submit his/her toy program design to the toy company, and help the toy company to prepare for the exciting new personality program release at a later time. Of course the toy company is encouraged to reward a user when his/her program is selected.

Other than providing a different personality to a toy at each interval of time, a toy company may release successive growing versions of programs to a doll. This business model enables the doll to grow every week or every month under the control of the toy company. The periodic release of programs is preferred to the method of providing of all different stages of personality programs on a CD ROM because it teaches a child to be patient, and get together with his/her toy of different personality no matter he/she likes it or not, a situation people always face in the real world.

Another technical problem is to be addressed with the periodic release of growing doll concept. This is because not all dolls are bought at the same time. Therefore dolls sold at different time may ask for different stage of the releases. A solution of this problem is to assign a user ID when the user is log into the remote web site. A new user log in the web site is provided the second stage of the release. Subsequent stage of program release is provided month after month, or week after week. The first stage of release is preferred to be factory installed. A real time clock is also preferred for the user programmable toy. This feature further enables the toy to provide interactive functions according to the time of the day or the date of the calendar. Instructions related to real time clock functions are therefore required for the compiling software. Setting the real clock time of the day can be achieved by activating the keypads, or though a program or automatic operation provided by the website when the toy is connected to the web site either through a computer or directly through a modem/dialer.

The novel features of the invention are set forth with particularly in the appended claims. The invention will be best understood from the following description when read in conjunction with the accompanying drawings.

DESCRIPTION OF PREFERRED EMBODIMENTS

Easy Format is an established programming method invented by the applicant as disclosed in U.S. Pat. No. 5,867,818. The traditional version of this programming method had been licensed by many different microcontroller IC supplying companies and is now an industrial standard used by product engineers to program microcontroller ICs for different kinds of electronics products. An example of the Easy Format programming software is represented by the programming format of FIGS. 1A and 1B, in accordance with the present invention. The programming format comprises of two fields or tables. The first field represented by Table 10 comprises a first co-ordinate 12 listing all the eight input/output (I/O) terminals and a second co-ordinate 11 listing all the I/O configuration states. Each element of the table represents the configuration of a terminal at a particular I/O configuration state. The first part of the programming process is to specify each element of the table with one of the eight symbols R, F, 1, O, X, H, L, and P as defined. Whenever a terminal is configured as an input terminal, a numbered event is to be specified. This is the event to be executed when a qualified input signal is received. Element 13 "F:E11" denotes the configuration of terminal 1 (Pin 1) of I/O State#1, whereas "F" denotes that the qualification signal is characterized by a falling edge, E11 denotes Event#11 is to be executed when a falling edge signal is received by terminal 1. Element 14 denotes that when a rising edge signal is detected by terminal 2, Event#2 is to be executed. Element 15 "X" denotes terminal 6 is a don't care terminal. Whenever an input terminal is configured to "X", any trigger signal received by the terminal is ignored. Whenever an output terminal is configured to "X", the output terminal is configured to have a high output impedance.

Figure 1A:
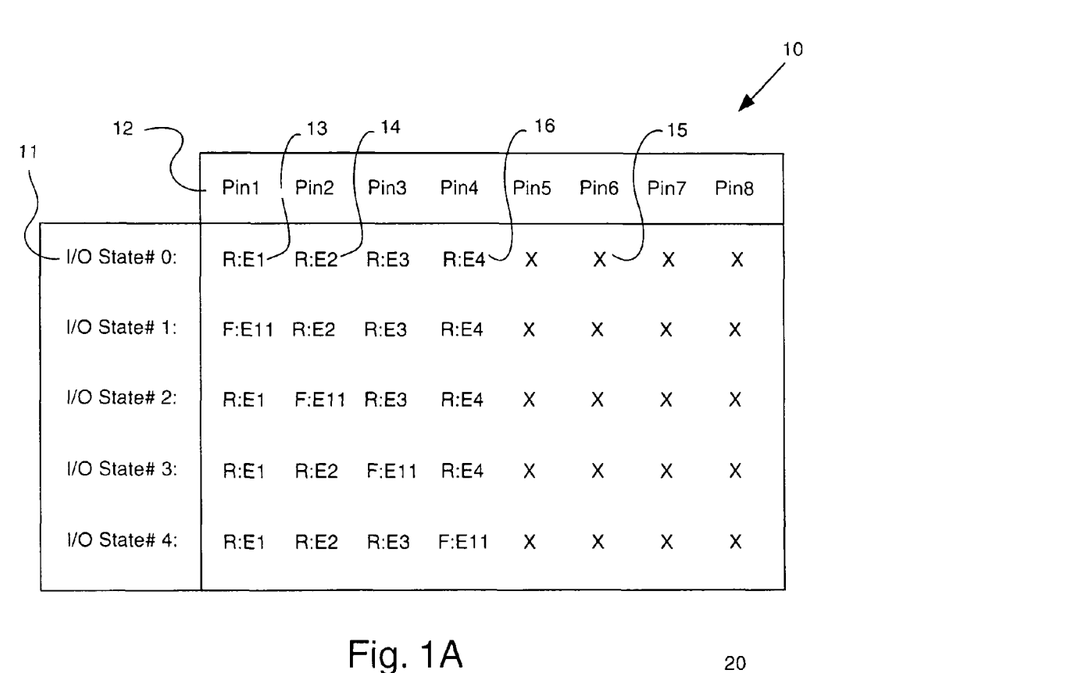
FIG. 1A demonstrated a state table of a traditional Easy Format program.
Figure 1B:
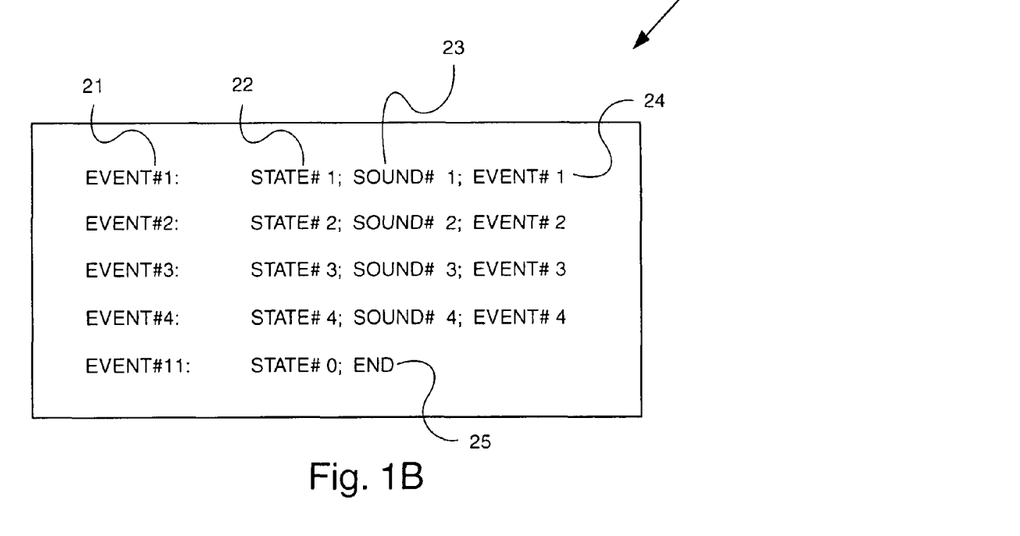
FIG. 1B demonstrated a path table of a traditional Easy Format program.

Attention is now directed to Table 20 of FIG. 1B, which comprises the second part of the programming format and defines the paths to be executed. A path may comprise of one or more events. Each path or event when executed performs a task such as generating an output signal, modifying an active I/O configuration state, initiate a timer counter or direct the execution to another path. Table 20 enlists the detail contents of all the paths and events to be executed according to Table 10. Line 21 denotes that the path named Event#1 comprises of three events 22 (STATE#1), 23 (SOUND 1), and 24 (EVENT#1). Suppose I/O State#0 is the active I/O configuration state; the reception of a rising edge signal by terminal 1 triggers the execution of Event#1; that is, sub-events 22, 23 and 24 will be executed in order. Event 22 denotes that the active I/O configuration state is changed from I/O State#0 to I/O State#1; then follow by the reproduction of the audio signal designated as "SOUND 1". When the reproduction of the sound is completed, sub-event 24 is executed which loop back the execution to "EVENT#1" and replay "SOUND 1" for another cycle. The looping continues until anyone of Terminals 1 to 4 of I/O States#1 receives a qualified signal. For example, when Terminal 1 detects a falling edge signal, the "SOUND 1" looping of Event#1 is interrupted and Event#11 is executed. Event#11 instructs the controller to return to I/O State#0 as the active I/O configuration state and the "END" symbol denotes the end of the event and the control apparatus is in an idle mode awaiting the next qualified input signals to be received as defined by I/O State#0.

At the power up of the control apparatus, an I/O configuration state is to be defined as the default power up I/O state; that is, the active I/O configuration state right after power up of the control apparatus. A convenient notation is to define I/O State#0 to be the default power up I/O state.

It should be noted that each I/O configuration state has no sequential relationship with each other and table 10 can be arranged in any order. Similarly, any path listed in table 20 also has no sequential relationship with another path unless it is designated as the event of another path as in Line 21. The paths can be numbered in any order and the numbers can be skipped if desired by the programmer. All events having sequential relationship are arranged in a single path line listing. This arrangement enables the programmer to have a much clearer picture of the program when compared with the multiple lines listing of regular assembly language programming.

Although the program table of FIG. 1 is organized into two fields as described, various modifications in format structure of the programming tables are possible while maintaining the simple to learn and easy tracibility nature of the invented programming method. Since the traditional form of Easy Format has already became an industrial standard and reference instructions had been published by U.S. Pat. No. 5,867,818 and many Easy Format licensees in the public domain, further in depth description of the traditional Easy Format software is not provided in this application. In summary, Easy Format is a compiling software, a programming language, or a programming tool that enables a user to program a microprocessor IC or a microcontroller to interact with external components. This programming software is defined to comprise the following programming steps:

(a) defining m input channels for said microcontroller to receive external data or signals, wherein m is an integer equal or greater than one;

(b) defining n output channels for said microcontroller to transmit data or signals, wherein n is an integer equal or greater than one;

(c) specify x configuration state, wherein each configuration state defines the configuration of at least one Input channel and/or one output channel and x is an integer equal or greater than one;

(d) specify y events to be executed by said microcontroller unit, wherein y is an integer equal or greater than one;

(e) specify an event to be executed when the signal or data received by an input channel a predefined qualifying condition and (f) enable an event to switch from a current configuration state to another configuration state.

Figure 2:
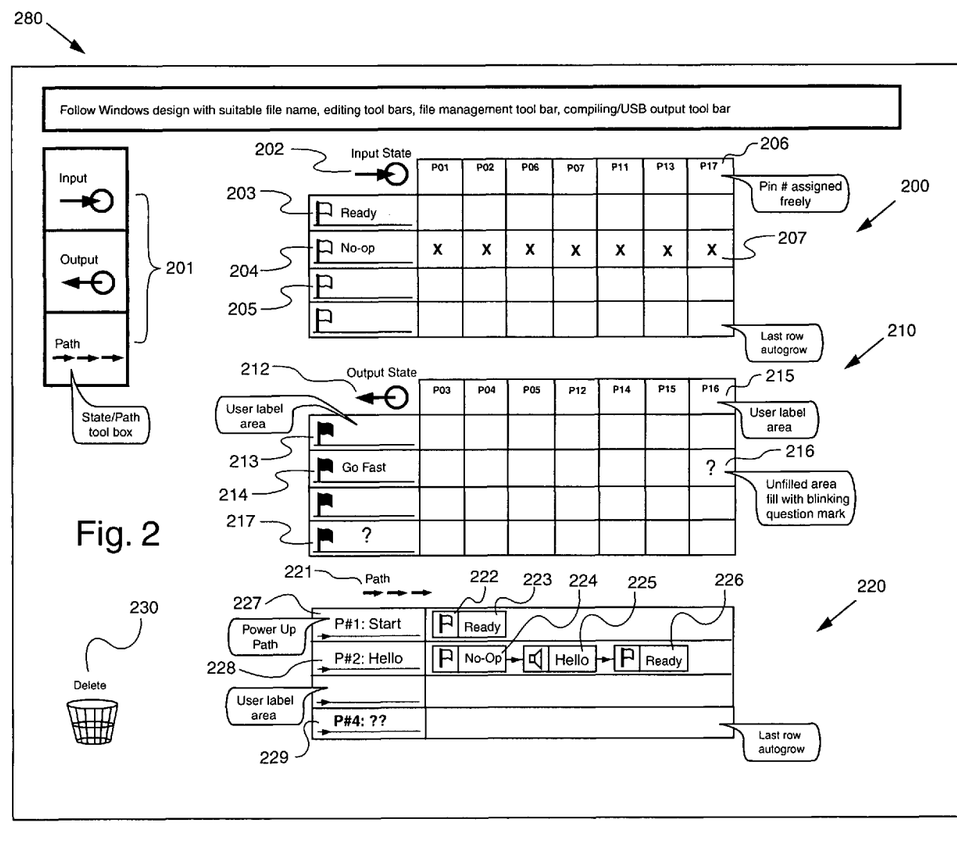
FIG. 2 illustrated an improved visual form of Easy Format program displayed on a computer screen.

Attention is now directed to FIG. 2, which illustrated an improved version of the traditional Easy Format compiling software shown on the computer screen, in accordance to this invention. User-friendly symbols and graphic labels related to a programmable toy are provided on a computer screen to facilitate composing an Easy Format program. Buttons 201 is a pull down menu to obtain labels of input state, output state or path elements. The sign 202 indicates that the table 200 is an input state table. The label 206 indicates the location of the input ports or pins of the microcontroller. Labels 203 to 205 are provided a special sign or specific color to signal that they are input states. When the state 204 named "No-op" is activated, all the ports P01 to P17 are set to "X", it means all these ports entered into a "don't care" state. The sign 212 indicates table 210 is an output state table. The label 215 indicates the location of the output ports or pins of the controller unit. Labels 213, 214 and 217 are provided by a different sign or different color (as compared with the labels of the input states) to indicate that these labels applies to output states. Elements 216 and 217 are provided with a blinking question mark to alert the user that an entry is missing or an error had been entered. The sign 221 indicates that table 220 is a path table, which describes the events to be executed when a path is called. Element 227 is a path #1 having a user assigned path name "start". When this path is executed, the input state is set to be active as indicated by the sign 222 and label 223. When the path 228 is activated, three events 224 to 226 will be executed in order. Event 224 set the input state No-op to active. Event 225 generates a voice "Hello". Event 226 deactivates the no-op state 204 and set the input state 203 Ready to active.

Figure 3:
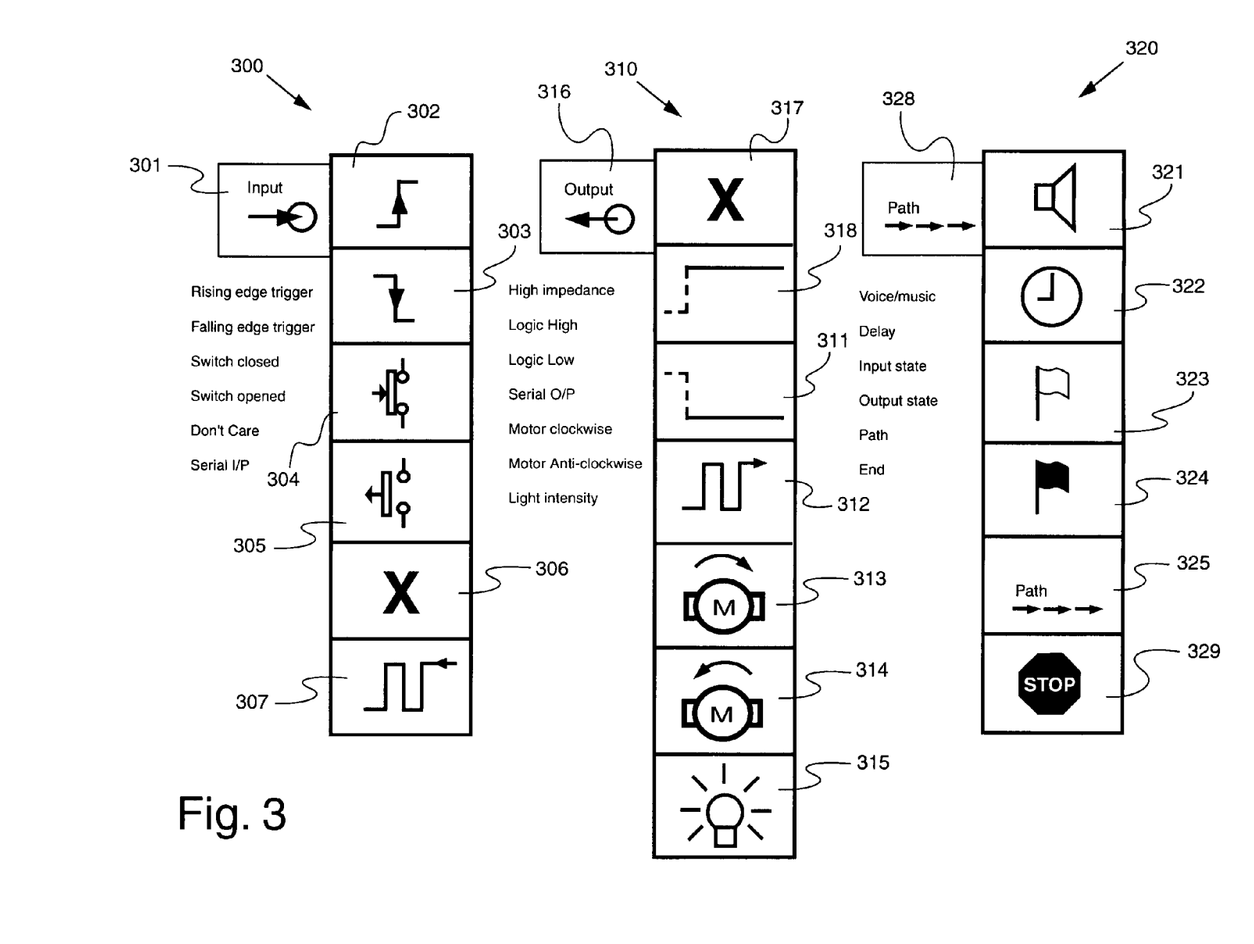
FIG. 3 demonstrated symbols provided to represent input channels, output channels and nature of the path equation elements in an improved Easy Format program.

Attention is now directed to FIG. 3, which provides the options available when an element of pull down menu 201 of FIG. 2 is triggered. Table 300 illustrates the signs 302 to 307 each represent a different qualifying condition for an input port to be triggered. For example, label 302 indicated that the port is triggered when a rising edge signal is detected. Label 303 indicates a falling edge trigger command. Label 304 indicates the port is triggered when a switch is closed. Label 305 indicates the input port is triggered when a closed switch is opened. Label 306 defines a "don't care" condition ignoring any input trigger from the port, or pin, or channel. Label 307 indicates the port is inputting a serial pulse and the qualifying condition depends on another predefined condition of the serial data received.

Table 310 represents the pull down menu of output ports. Label 317 indicates the output port is set to high impedance. Label 318 indicates the port is set to level high. Label 311 indicates the port is set to level low. Label 312 indicates the port is set to the configuration of a serial output port and the serial data to be sent will depend on the event to be executed. Label 313 indicated that motor control is connected to this port and the motor is instructed to turn clockwise. Label 314 indicates that the motor is instructed to turn anticlockwise. Label 315 indicated a light transducer is controlled by this output channel or port and the light is turned on when this port is set. There are also labels not shown in the table to turn off motor or lighting devices. Table 320 indicated the common labels to be used in a path, which executes a series of events according to the program. Label 321 indicated a sound is to be generated. Label 322 indicates a delay time is required before the next event is executed. Label 323 indicates an input state is to be set active. Label 324 indicates an output state is to be set active. Label 325 indicates the program is going to jump to another path. Label 329 indicates the program will be put to stop and wait for another input trigger to activate another event path. Label elements of these pull down menu can be drag and drop to the appropriate location of the state and path tables during composing of the user-friendlier Visual Easy Format program.

Figure 4:
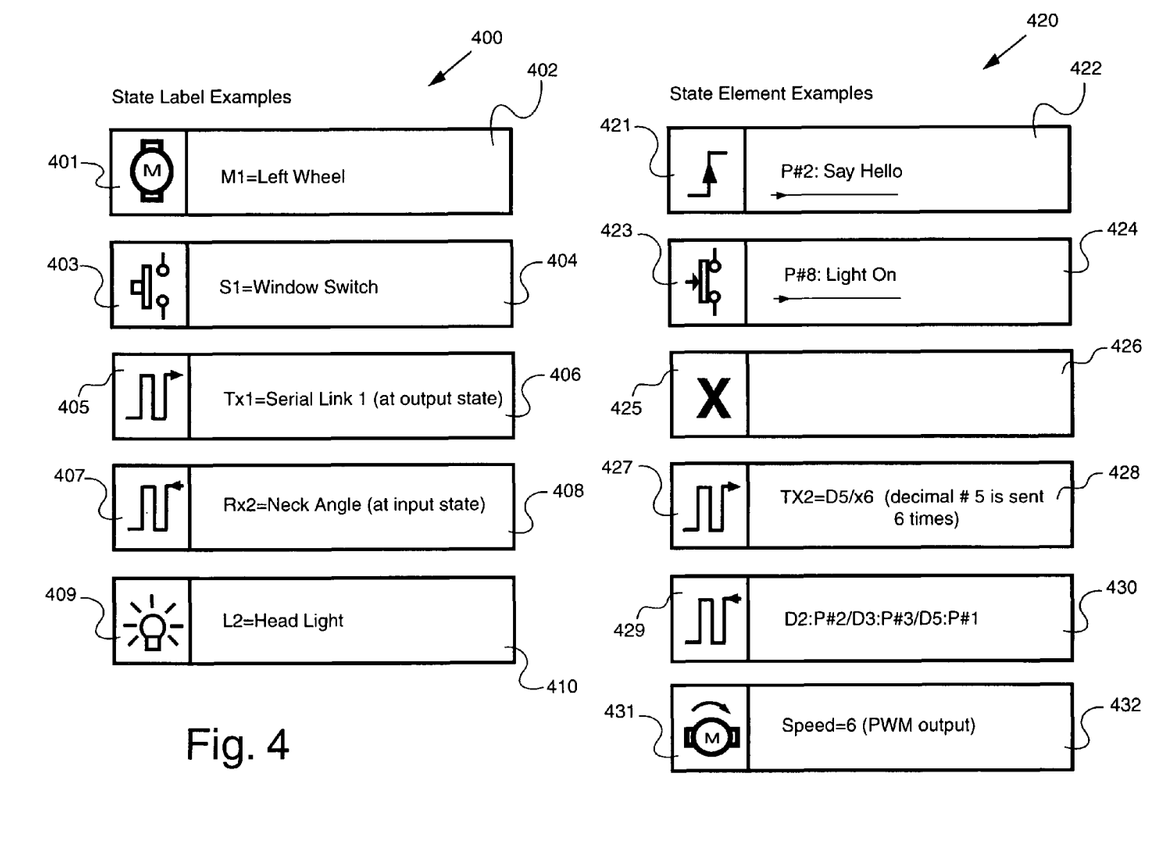
FIG. 4 demonstrated examples of labels to be used in a State table of visual Easy Format programming.

Table 400 of FIG. 4 indicates the user-defined information to be filled after a state label is drag and drop to the appropriate location of a state table. Label 401 is a motor label obtained from the pull down menu. The user is then required to define the name of the motor. In this case the user define this motor to be motor #1 representing the motor to drive the left wheel. The user also defines the label 403 to be the window switch S1 when he is making use of the building kit to design and build a home security system. Similarly, all the labels 405, 407 and 409 are defined with appropriate user defined names. Table 420 indicates the actions to be performed, the path to be executed or the parameters to be set when a qualified signal is received. For example, when label 421 is activated, Path #2 having a name "Say Hello" is executed. When label 431 is activated, the Motor M2 is set to run at speed setting #6, as controlled by pulse width modulation.

Figure 5:
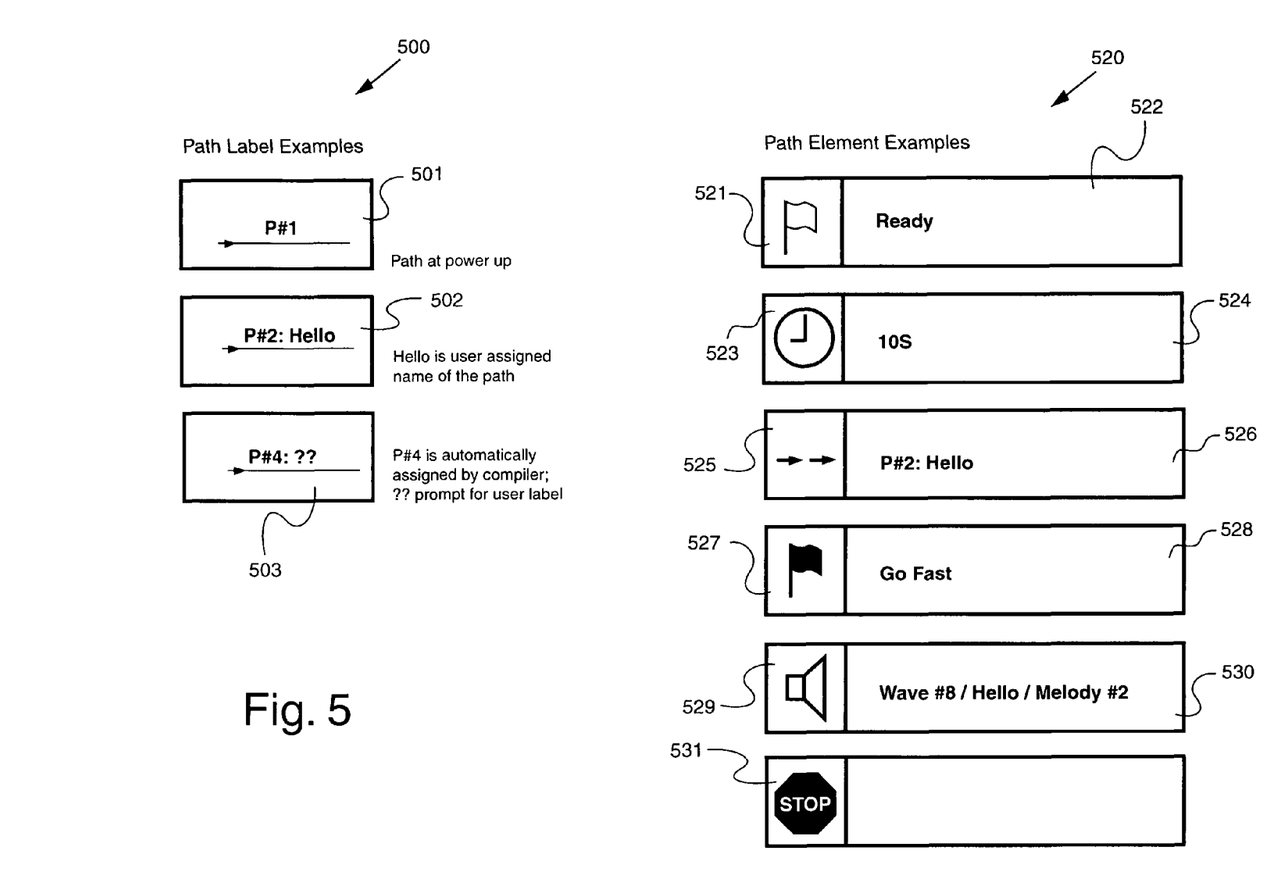
FIG. 5 demonstrated signs and labels used in Path a table of visual Easy Format programming.

Table 500 of FIG. 5 indicates the path label examples. Label 501 indicates a power up default path P#1. This is the default path to be executed during power up. If the user forgot to define a path, blinking question mark will prompt the user to fill in the path name or to delete the path from the path table. Dragging and dropping a path label to the recycle bin 230 of FIG. 2 deletes a path. Table 520 indicates examples of defining the event provided in a path equation. Labels 521 and 522 will set the state named "Ready" to become active. Label 523 and the data 524 will trigger an event to delay for 10 seconds. Label 529 will generate three sounds "Wave #8", the "Hello" voice file and the "Melody #2" file simultaneously.

Figure 6A:
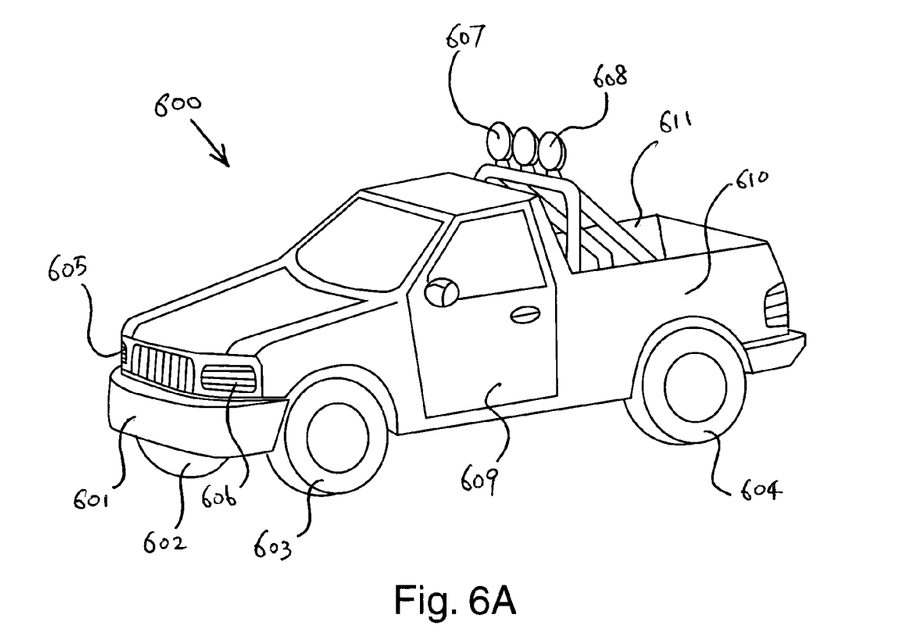
FIG. 6A illustrated a toy size motor vehicle which provides sensors and transducers for interactive play patterns.
Figure 6B:
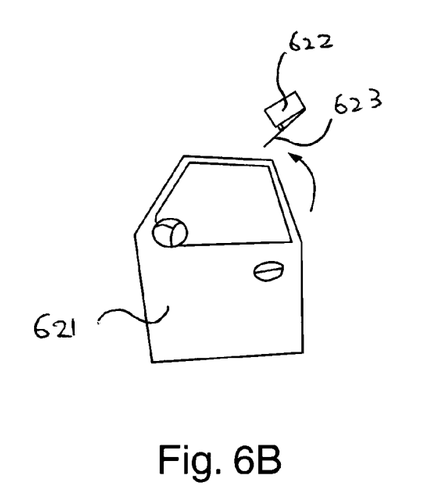
FIG. 6B illustrates the interaction of the door with a position switch sensor for the vehicle of FIG. 6A.
Figure 6C:
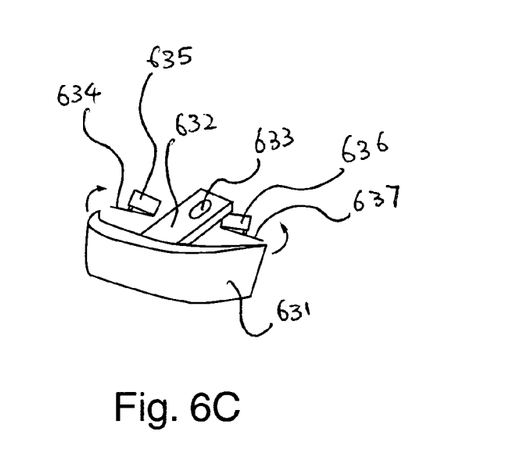
FIG. 6C illustrates the structure of a bumper to interact with two position sensors.

Attention is now directed to FIG. 6A, which illustrated an example of a programmable toy article provided in the shape of a motor vehicle 600. A motion transducer represented by a motor is provided inside the motor vehicle for steering the front wheels 602 and 603. Another motor engaged with the rear wheels 604 is provided for driving the motor vehicle forward or backward. A sound transducer represented by a speaker is provided to produce vehicle related sounds, or any other sound files selected by the user in programming the toy vehicle 600. The head lights 605, 606 and the search/warning lights 607 to 608 are equipped with LEDs. Each of these LEDs can be turned on an off according to the user program. The door 609 can be opened for the user to access more electronics features provided inside the cabin of the vehicle. A bumper 601 equipped with motion sensors is provided for programming responsive action when the car hits an obstacle such as a wall. FIG. 6B illustrates an example for a position switch or motion sensor provided to improve enhanced interactive play value. When the door 621 is closed, the lever 623 activates the switch 622, which provides a signal to the microprocessor inside the car. This signal enables the user to program interactive sound or visual responses when the door is opened or closed. FIG. 6C illustrates the internal structure of the bumper which enables the user to program different visual, sound or motion responses when the motor vehicle hits a wall. Behind the bumper 631 is a structure lever 632 which engage the bumper to the front end of the motor vehicle. The slot 633 interacts with a pivot pole inside the motor vehicle and a counter spring provided between the bumper and the vehicle enable the bumper to be push back after a compressed bumper is released. A signal sent by the position sensor 635 indicates that the right hand region of the bumper hits an obstacle. A signal sent by the position sensor 636 indicates that the left hand region of the bumper hits an obstacle. When signals are sent by both sensors 635 and 636 simultaneously, the front end of the motor vehicle hits an obstacle. Interactive responses such as reversing the vehicle, producing a back up sound or turning on the tail light can be programmed according to the desire of the user.

Figure 7A:
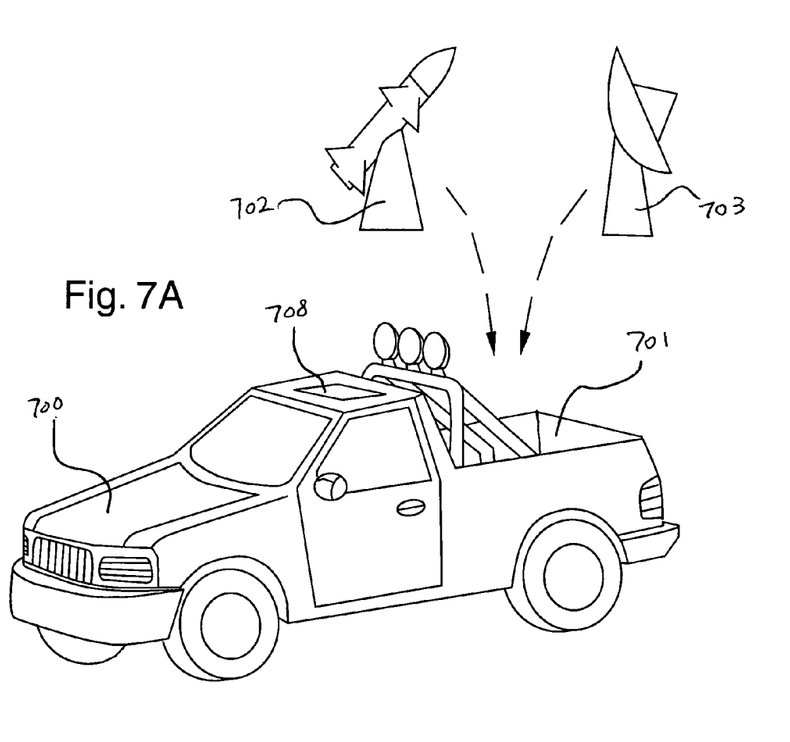
FIG. 7A demonstrated a master toy member represented by the vehicle of FIG. 6A to work with different accessory toy members, each having an identification component.
Figure 7B:
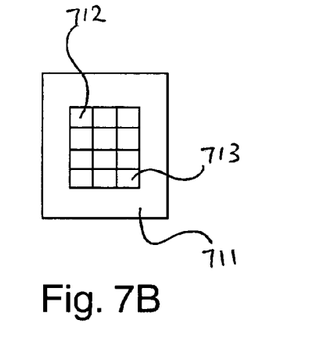
FIG. 7B illustrates a key pad for a user to control a programmed toy article.
Figure 7C:
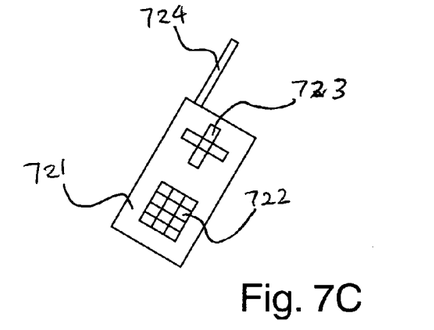
FIG. 7C illustrates a remote controller for controlling a programmable toy article.

FIG. 7A indicates another preferred feature of a programmable toy vehicle. The motor vehicle that represents a master toy member 700 is provided with a set of accessory toy members 702 to 703. Inside the trunk of the motor vehicle 700 is a receiver, which detects an identification signal of the accessory toy members 702 to 703 when any of the accessory toy member is placed inside the trunk 701. Upon receiving an identification signal, the microcontroller provides a response related to the identified accessory toy member according to the program flow of program composed by the user. A wired or wireless design can be provide inside each accessory toy member for providing the identification signal required. Typical example of wired or contact type of identification design is to provide an integrated circuit inside the accessory toy member to send out an identification signal when a contact is made between the master toy member and the accessory to member. A simpler design is to provide a resistor of specific value inside an accessory toy member. The master toy member is provided a circuit to measure the value of the resistor so as to identify the nature of the accessory toy member making the contact. Alternately, a wireless circuit such as a RFID can be provided to achieve wireless identification effect. In another preferable design, a key pad 711 of FIG. 7B can be provided on top of a programmable toy article to provide interactive response or directing different play modes by the users after the toy article is programmed. In the exemplary embodiment of 700, this keypad can be positioned at the top of the motor vehicle as shown in the position 708. There are different kinds of keypad designs. A preferred design according to the nature of this invention is the numerical keypad design similar to that of the telephone. This keypad is particular useful when the toy article is programmed to provide different kinds of sequential actions, or play modes when a key, or a key sequence is entered. For example, when the key #6 is entered, the motor enters a rescue mode, which rushes the vehicle into a series of panic motions and sounds. When the key #9 is entered, the motor vehicle enters a diagnostic mode. Each of the motors is momentarily turned on in clockwise and reversed directions for trouble shooting of the motor related mechanism. Each of the lights can also be sequentially turned on and off to show that all the lights are working properly. Many other features can be programmed into the toy according to the wish of the user. For example, when a predefined sequential code 12321 is entered into the keypad, the toy vehicle can be programmed to enter a lock mode so that no other people can play with the vehicle unless another secret release code is entered into the keypad. Although a keypad allows the user to provide many different unusual functions for different sequential controls or play mode selections according to the program written by the user, a remote control circuit adds more fun to the programmable toy. FIG. 7C illustrates an example of a remote controller which sends control signals to the remote control receiver provided inside the vehicle 700 of FIG. 7A. For example, the user may program the vehicle to change moving direction when signals reflecting the direction control keypad 723 of the remote controller 721 is received. Alternately numeric keypad 722 of the remote controller may be used to substitute the keypad 711 installed on the motor vehicle for providing different programmed controls.

The signals received from the remote controller can also be programmed to provide many different kinds of exciting play modes. For an example, the motor vehicle 700 can be programmed to provide many different play modes; each play mode represents a different play pattern or sequence of light sound and motion. These play modes designed by the user can be selected by pressing a specific key of the keypad. When the vehicle is performing a preprogrammed play mode sequence, the microcontroller inside the vehicle can be programmed to continue to receive remote control signals. A remote control signals received can be programmed to override the original sequential control program flow. This special design added unusual value to the preprogrammed toy. For example, another toy vehicle equipped with special stunt action capability can be selected to perform a preprogrammed sequence of stunt show action #5 (by selecting the keypad #5) on a playground near a pool. When the vehicle is getting too close to the pool, the user can use the remote control to interrupt the stunt show #5 performance and steer the vehicle to a safe location before the stunt show performance resumes.

Figure 8A:
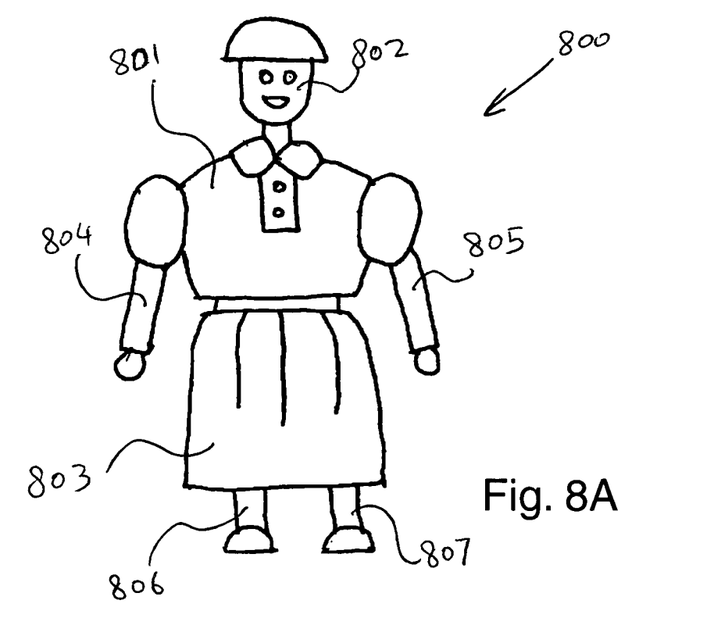
FIG. 8A illustrated a user programmable doll.
Figure 8B:
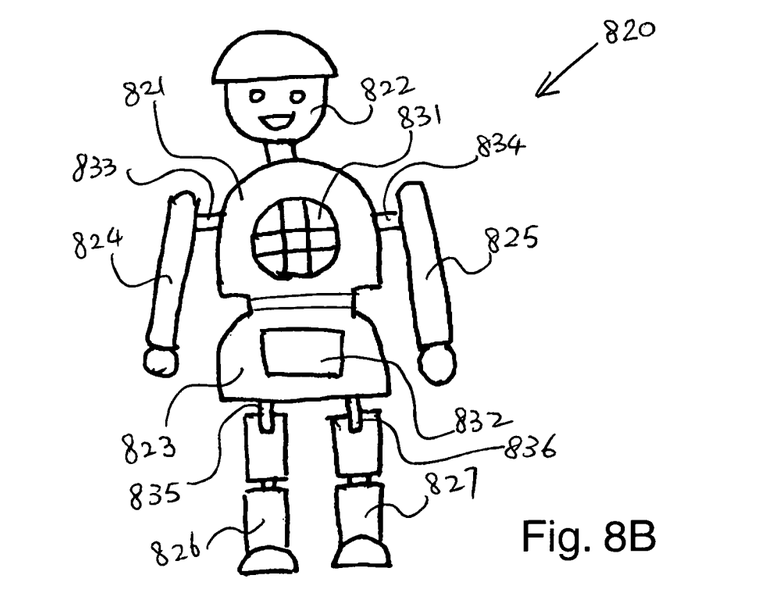
FIG. 8B illustrated a user programmable robot, or the inside view of the user programmable doll of FIG. 8A.

Attention is now directed to FIG. 8A which illustrates another user programmable toy provided in the shape of a doll 800. The doll has a head 802, an upper torso 801, a lower torso 803, upper limbs 804, 805 and lower limbs 806 and 807. FIG. 8B shows the inside view of the doll when the cloth is removed. Motorized mechanisms are included to provide motion of the head and the limbs against the torso, and also between the upper and lower torsos. Position sensors can be provided to generate signals when a user moves the limbs or head of the doll. Additional sensor switches such as a big push button switch 832 can be provided at different locations of the torso. A sound transducer, represented by a speaker 831 is included to provide sound responses. All the motor control circuits and sensor signals are connected to the microcontroller installed inside the doll. Voice and sound files related data are also stored inside the memory of the microcontroller circuit. A compiler program is provided for the user to compose a program that provides interactive sound and motion responses when a sensor signal is received.

Figure 9A:
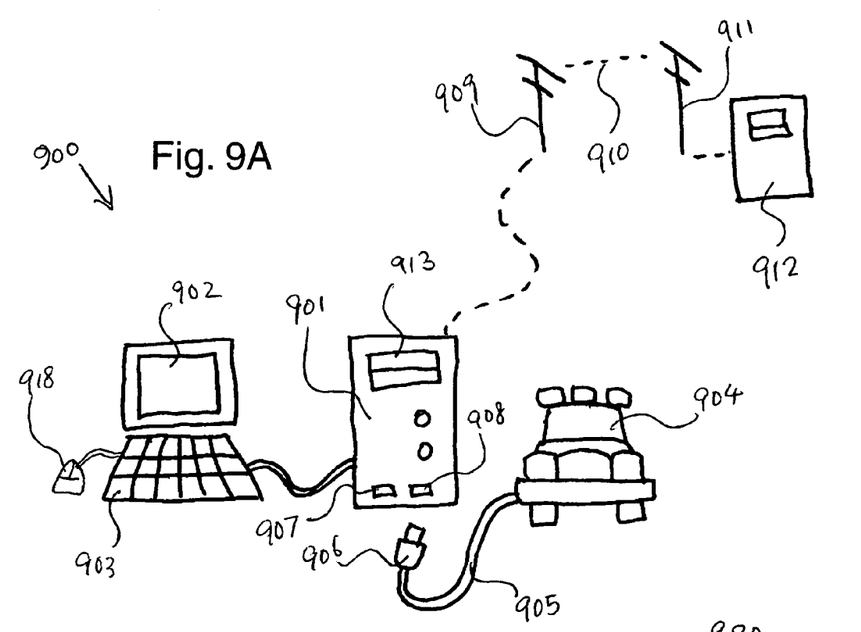
FIG. 9A illustrated a setup to program a user programmable toy.
Figure 9B:
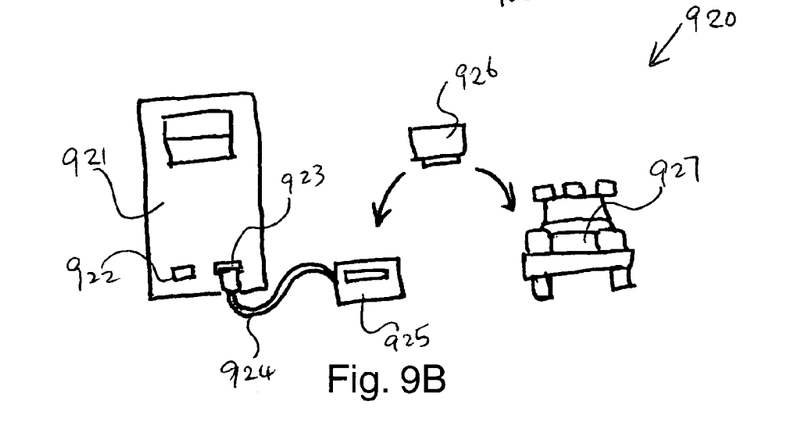
FIG. 9B illustrated an alternate setup to program a user programmable toy.

FIG. 9A illustrates the system for the toy to be programmed by a user. The computer system represented by the monitor 902, the keyboard 903, the pointing device 918 and the computer unit 901 forms a programming system. Compiler software such as an Easy Format compiler is provided by a memory media including but not limited to CD ROM. This compiler program is installed on the computer 913 via the CD ROM reader 913. Alternately the compiler software can be downloaded from a remote web site, or a remote computer 912 through a remote link 909 to 911. The programmable toy is connected to the computer through a communication port such as the USB ports 907 and 908 as illustrated. The user is first required to learn the specific programming rule of the compiling software and then starts to write a program defining how the toy is to perform. Typical user program is written with a process to define how the user wants the toy to response when a sensor signal is received. Depends on the skill of the user, a user program can be very complicated. A flow chart can be very helpful for program flow planning. There are many different kinds of flow chart look alike compiling software provided in the market. Since flow chart is a two dimensional presentation, multiple layers of interaction makes the flow chart language difficult to handle many kinds of complex event driven programming activities. Accordingly Visual Easy Format, or other enhanced type of Easy Format compiling software is preferred for users who have little knowledge of engineering and programming background to handle the job. Once a user completed composing a program, the user program is compiled and translated into codes executable by the microcontroller inside the programmable toy. The code that controls the operation of the microcontroller is then downloaded into the toy through the communication port 908 and the communication link 906 and 905. Alternately the user may download the code into a memory cartridge 926 as shown in FIG. 9B, and then the memory cartridge storing the executable code is connected to the toy 927 for the execution of the microcontroller.

The communication link 909 to 911 serves as an important of this invention. First of all, a library of programming tips and supporting tools can be provided to the users from the remote web site. Alternately, the user may obtain mentoring support from a remote help desk. Remote help desk for user programming had not been successful because most programs written in assembly language and even high level languages such as C and Java are very difficult to be understood by a third party. Since Easy Format is such a user-friendly programming language, most people can understand the program flow of a program written by others easily. The remote help desk concept to support user programming therefore starts to make sense. In another application example, the user may exchange programs written by other people through the remote web site. A user may also modify the program according to his/her desire before it is compiled and downloaded into the toy. A toy company may also support the programmable toy product line by posting exciting or valued application programs for user to download into their programmable toy. For example, a toy company selling a programmable doll product line may release one version of application software periodically. Each version will give the doll a different personality. In another example, a doll named Jenny may be released in May. Jenny is an athletic young girl who is always happy. The personality of Jenny is reflected in the words and motions provided in Jenny's program. In June the new code released will define the doll to be Mary, who is timid and always very cautious. In contrast, Mary's software always come with very soft sound. Since Jenny and Mary are of completely different personality, the toy company may provide a business model that prepares different fashions and sets of accessory toy members to support the code release of each month. Some of the supporting toys can be interactive accessory toy members to provide interactive actions previous discussed. Since the memory size equipped inside the doll to store program code and compressed voice messages are always limited, another exciting feature can be provided for this business model by posting a large library of voice messages for each doll on the web site to support it's release. The user is then able to select the particular preferred play modes and voice messages for his/her toy. Since the programs released each month is open to the public, the user is able to modify the program and the personality of the toy of the month when desired. Another business model allowed by this toy invention is for the user to post their own program on the website for exchange with other users. A user may also submit his/her toy program design to the toy company, and help the toy company to prepare for the exciting new personality release at a later month. Of course the toy company is expected to reward a user when his/her program is selected. Other than providing a different personality to a toy at each interval of time, in another business model a toy company may release successive version of a doll having the doll grows every week. It means a program that provides a more intellectual or growing personality is released every week. The periodic release of program is preferred to the method of providing of all different stages of personality programs on a CD ROM because it teaches a child to be patient, and get together with his/her toy no matter he/she likes it or not, a situation that people always face in the real world.

There is another technical problem to be addressed with the periodic release of growing doll concept. Since not all dolls are bought at the same time, therefore dolls sold at different time may ask for different stage of the releases. A solution of this problem is to assign a user ID when a user logs in the remote web site. A new user is always provided the second stage of the release. Subsequent growing stages of program releases are provided month after month, or week after week. The first stage of release is always preferred to be factory installed.

Figure 10:
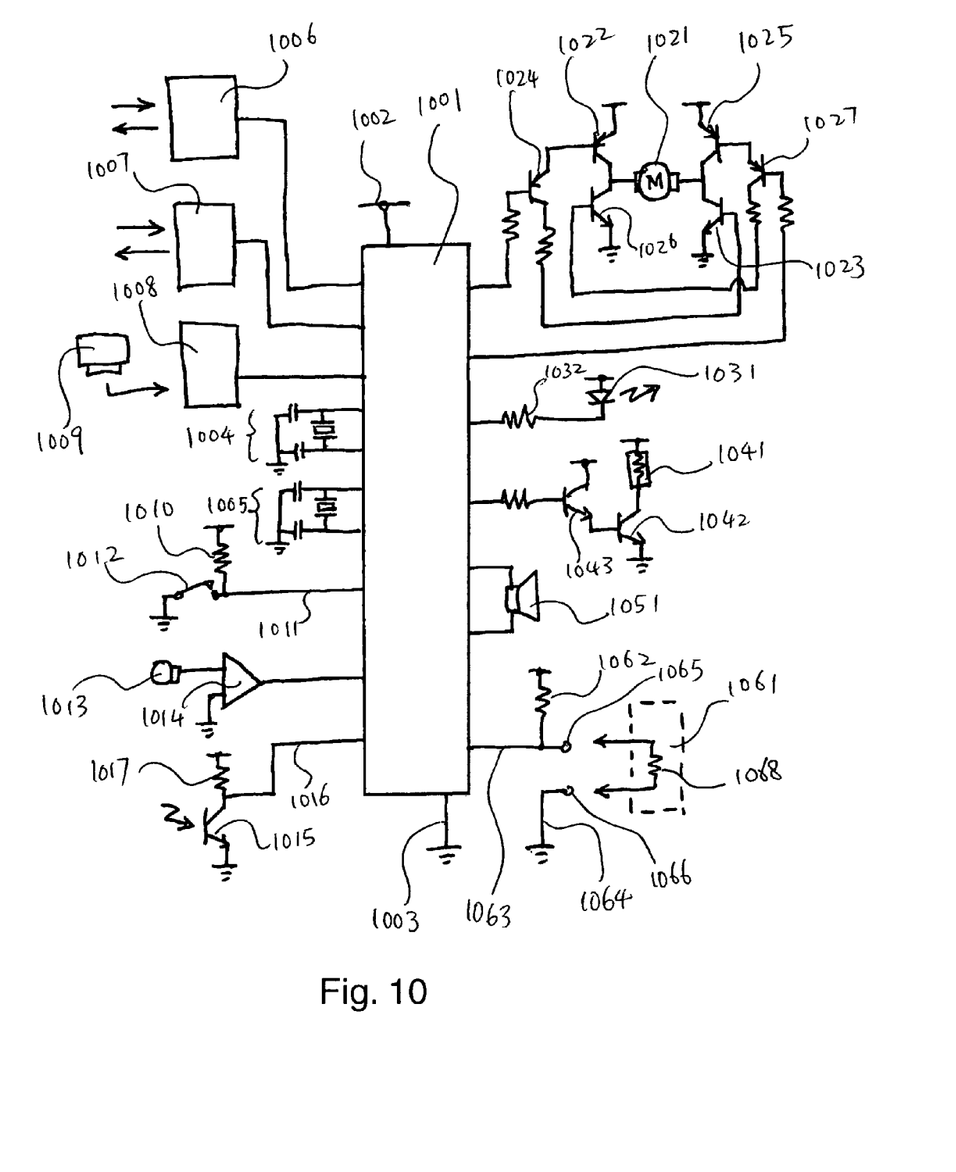
FIG. 10 illustrated an electronics circuit of a user programmable toy.

Attention is now directed to FIG. 10, which illustrates the circuit diagram of a preferred user programmable toy embodiment. The microcontroller 1001 is provided with internal memory for storing a compiled user program or the compressed sound files required by the user program. Most sound files are obtained from analog sound signals, that were converted into digital format by different methods such as the PCM process to form the digital sound files. Sound files occupy a lot of memory capacity. Accordingly digital sound files are usually compressed by different kinds of algorithms such as ADPCM or CELP before they are stored inside the memory of a toy. The microcontroller is supported with a high speed clock circuit 1004 which offer it the speed and power to decompress, or decode the compressed sound files stored inside it's memory and play back the sound at the right speed and pitch. In another preferred embodiment, the microcontroller is also supported with another slower clock generating circuit 1005 at the same time. This clock generating circuit provides a low power real time clock reference to the microcontroller. Although it is also possible for the microcontroller to make use of the higher speed oscillator circuit 1004 to become a real time clock signal generator, a slower frequency real time clock generator is usually preferred for battery life conservation. This is because the slower clock usually consumes much smaller battery power than higher clock rate and the real time clock is required to run 24 hours a day. A suitable microcontroller design suitable for this application is to have the microcontroller enter into a low power mode while the toy is idle and the low power real time clock circuit keeps on running. The real time clock feature adds a lot of value to the toy. First of all, the toy can be programmed to become an alarm clock. The rectangular area 832 of the toy 820 as illustrated in FIG. 8B can be interpreted as an LCD display to show the real time of the day. An alarm time can be set by using the keypad of FIG. 7B or the remote controller of FIG. 7C, which is installed at the rear side of the toy 820. The user is also capable of selecting and programming in a preferred sound when an alarm time arrives. A more capable user may also be desire to program in different loudness of alarm sound when the alarm time arrives, starting from a mild sound and then gradually grows to a very loud sound. The programmability of the toy offers an opportunity for the user to program the toy not only for fun, but also for different kinds of practical daily applications. Alternately, the toy company may offer many different real life application programs on a CD ROM, or on the web site to help promoting the programmable toy product line. The block 1006 of FIG. 10 represents a first interface such as a USB interface, a parallel port interface, a Wi-Fi interface, or a blue tooth interface for the toy to interface with a computer. The block 1007 represents a remote control interface, a modem, or a telephone dialer and interface circuit as an alternative way for the toy to communicate with the external world. A modem adds another exciting feature to the toy. It allows the toy to be controlled by a remote computer or a mobile phone when the toy is connected to the phone line. If only the periodic download feature is required, the modem and dialing circuit enable the toy to download the periodic release of the program from the remote website without involving a computer. Block 1008 represents a connector to receive the memory cartridge 1009 storing the compiled program codes and sound data. This design is possible when a direct download design is not selected due to cost or marketing reasons. A position sensor or contact switch is represented by the switch 1012 for sending a contact or position signal to the microcontroller. The resistor 1010 is a pull high resistor, which may be required in some microcontroller designs. Sound signals may be picked by a microphone 1013. A weak sound signal is usually amplified by the amplifier 1014 before it is sent to the microcontroller. The microcontroller may provide a threshold detector to determine when a loud enough sound signal is received for triggering a response. Alternately it may comprise an analog to digital converter circuit for recording a sound waveform into digital format, and store the digital sound data for playback at a later time. The transistors 1022 to 1027 controlled by the microcontroller drive a motor 1021 either in a clockwise or anticlockwise direction.

Visual output can be provided by a typical LCD driving circuit or simply by an LED 1031. A heater 1041 driven by transistors 1042 and 1043 can be provided for a toy, which requires heat energy such as in the case of a cooking toy. Compressed sound files in digital format stored inside the memory of the microcontroller can be decoded and reproduced via a sound transducer, such as the speaker 1051. The microcontroller may provide a digital to analog converter for delivering an analog sound signal to the speaker 1051. Alternately, it may provide digital PWM signal and drive the speaker 1051 directly as shown. The contact terminals 1065 and 1066 are provided for the microcontroller to identify an external accessory toy 1061. Each external accessory toy is equipped with an identifying component, and in this embodiment a resistor 1068 of specific value. When the resistor 1068 is connected with the contact terminals 1064 and 1065, it forms a potential divider with the reference resistor 1062. The voltage level at contact 1065 is fed to an analog to digital converter inside the microcontroller. Different value of the resistor 1068 will provide a different voltage level at point 1065. Different voltage level indicates the different identities of the external accessory toys.

From the foregoing, it can be appreciated that the hardware and software embodiments of the programmable toy have been adequately disclosed herein enabling engineers to develop the toy systems invented. It should be noted that the memory storing program data and digital sound data stored inside the microcontroller 1001 of FIG. 10 might be replaced by external memory if desired. Similarly the microcontroller 1001 of FIG. 10 can be replaced by multiple microcontrollers to facilitate programming work or provide higher speed responses. The preferred embodiments of the invention described herein are exemplary and numerous modifications, specification variations and circuit rearrangements can be readily envisioned to achieve an equivalent result, all of which are intended to be embraced within the scope of the appended claims.

The invention claimed is:

1. A user programmable toy system configured for programming a toy comprising;
   a microcontroller;
   a computer memory configured for storing digital data provided by a software for controlling and executing by said microcontroller;
   at least one transducer to provide a response according to a signal provided by said microcontroller;
   at least one sensor for seeding a signal to said microcontroller;
   an improved Easy Format software enabling said user to compose a user program for directing said microcontroller to provide a response when a signal is received from said sensor and to energize said transducer according to the program flow of said user program; wherein said improved Easy Format software comprises additional features of an Easy Format software, which includes the steps of:
   (a) defining m input channels for said controller unit to receive external data or signals, wherein m is an integer equal or greater than one;
   (b) defining n output channels for said controller to transmit data or signals, wherein n is an integer equal or greater than one;
   (c) specify x configuration state, wherein each configuration state defines the configuration of at least one input channel and/or one output channel and x is an integer equal or greater than one;
   (d) specify y events to be executed by said controller unit, wherein y is an integer equal or greater than one;
   (e) specify an event to be executed when the signal or data received by an input channel satisfied a predefined qualifying condition and
   (f) enable an event to switch from a current configuration state to another configuration state;
   said Easy Format software further comprises at least one of the following steps or characteristics:
   (g) a step to specify at least one of the events to comprise of p sub-events, wherein p is an integer equal or greater than two;
   (h) a step to specify an event to be triggered by a timer or timing signal;
   (i) a step to structure the programming specifications into at least two fields, wherein the first field specifies the characteristics of one or more states, and the second field specifies one or more events/sub-events;
   (j) a step to organize at least a part of the data specified by said steps into a table format;
   (k) wherein said states and events are not necessary to be listed in sequential relationship to each other;
   (l) a step to label part of a table format program for specifying the power up default condition of said user programmable toy system;
   and wherein said improved Easy Format software is further configured to support at least one of the following additional characteristics (1) to (3):
   (1) wherein said transducer is a sound transducer, and said improved Easy Format software is further configured to handle communication with an external resource remote or separated from said programmable toy set, and to fetch data representing one or more sound files obtained from said external resource and for said microcontroller to process said data and generate a sound with said sound transducer;
   (2) wherein said user programmable toy set comprises a master toy member and two or more accessory toy members; wherein each accessory toy member comprises an element for said master toy member to identify an accessory toy member; said software program is further configured to enable said user program to direct said microcontroller to provide a response when a predefined accessory toy member is identified; and
   (3) wherein said user programmable toy set further comprising a real time clock generator, wherein said user program allows said user to define a specific time of a day and to direct said microcontroller to provide a response when the time of said real time clock matches with the specific time defined by said user;

and wherein any of said additional characteristics are compatible with said configuration states and/or events format for a user of said programmable toy system to compose an improved Easy Format program; and wherein said improved Easy Format software is further configured to compile or translate a user composed program having any of said characteristics into codes executable by said microcontroller.

2. The user programmable toy system of claim 1 wherein any of said additional characteristics comprises a specific programming instruction having a graphic representation configured for controlling a member or a feature of said programmable toy system.

3. The user programmable toy system of claim 1 wherein said improved Easy Format software comprises specific programming instructions configured for said user to interact with a remote computer or web site for composing said user program.

4. The user programmable toy system of claim 1 wherein said user programmable toy system comprises a building kit and said improved Easy Format software is configured for said user to program an article built by said user.

5. The user programmable toy system of claim 1 wherein said user programmable toy system further comprises any of the following elements:
  (j) heat transducer;
  (k) light transducer;
  (l) sound transducer; and
  (m) motion transducer;
  (n) motion sensor;
  (o) sound sensor;
  (p) light sensor;
  (q) a computer interface circuit; and
  (r) a dialing circuit.

6. The user programmable toy system of claim 1 wherein said improved Easy Format software is provided by a memory media or a remote computer or web site for said user to program said toy set.

7. A user programmable toy system comprising:
  a microcontroller;
  a computer memory configured for storing digital data for controlling and executing the operation of said microcontroller;
  at least one sensor for sending a signal to said microcontroller;
  at least one transducer to provide a response according to the direction of said microcontroller; wherein
  an improved Easy Format software enabling said user to compose a user program for directing said microcontroller to provide a response when a signal is received from said sensor and to energize said transducer according to the program flow of said user program; wherein said improved Easy Format software comprises additional features of an Easy Format software, which includes the steps of:
    (a) defining m input channels for said controller unit to receive external data or signals, wherein m is an integer equal or greater than one;
    (b) defining n output channels for said controller to transmit data or signals, wherein n is an integer equal or greater than one;
    (c) specify x configuration state, wherein each configuration state defines the configuration of at least one input channel and/or one output channel and x is an integer equal or greater than one;
    (d) specify y events to be executed by said controller unit, wherein y is an integer equal or greater than one;
    (e) specify an event to be executed when the signal or data received by an input channel satisfied a predefined qualifying condition and
    (f) enable an event to switch from a current configuration state to another configuration state;
  said Easy Format software further comprises at least one of the following steps or characteristics:
    (g) a step to specify at least one of the events to comprise of p sub-events, wherein p is an integer equal or greater than two;
    (h) a step to specify an event to be triggered by a timer or timing signal;
    (i) a step to structure the programming specifications into at least two fields, wherein the first field specifies the characteristics of one or more states, and the second field specifies one or more events/sub-events;
    (j) a step to organize at least a part of the data specified by said steps into a table format;
    (k) wherein said states and events are not necessary to be listed in sequential relationship to each other;
    (l) a step to label part of a table format program for specifying the power up default condition of said user programmable toy system;
  and wherein said improved Easy Format software is characterized by a specific programming instruction configured for controlling a member, a function, or a feature of said programmable toy system, wherein said specific programming instruction is represented by a graphic representation compatible with said configuration states and/or events format for a user of said programmable toy system to compose a program; and
  wherein said improved Easy Format software is further configured to compile or translate said graphic representation and said improved Easy Format program composed by said user into codes executable by said microcontroller.

8. The user programmable toy system of claim 7 wherein said transducer is a sound transducer, and said improved Easy Format software is further configured to fetch data representing one or more sound files obtained from an external resource and for said microcontroller to process said data and generate a sound with said sound transducer.

9. The user programmable toy system of claim 7 further comprising a master toy member and two or more accessory toy members each comprises an element for said master toy member to identify an accessory toy member; said improved Easy Format software is configured to enable said user program to direct said microcontroller to provide a response when an accessory toy member is identified.

10. The user programmable toy system of claim 7 further comprising a real time clock generator, wherein said improved Easy Format software is configured for allowing said user to define a specific time of a day and to direct said microcontroller to provide a response when the time of said real time clock matches with the specific time defined by said user.

11. The user programmable toy system of claim 7 wherein said improved Easy Format software comprises specific programming instructions for said user to interact with a remote computer or web site and for composing said user program.

12. The user programmable toy system of claim 7 wherein said user programmable toy system comprises a building kit and said improved Easy Format software is configured for said user to program an article built by said user.

13. The user programmable toy system of claim 7 further comprises any of the following elements:
(j) heat transducer;
(k) light transducer;
(l) sound transducer; and
(m) motion transducer;
(n) motion sensor;
(o) sound sensor;
(p) light sensor;
(q) a computer interface circuit; and
(r) a dialing circuit.

14. A user programmable toy system configured for programming a toy comprising:
a microcontroller;
a computer memory configured for storing digital data provided by a software for controlling and executing said microcontroller;
at least one transducer to provide a response according to a signal provided by said microcontroller;
at least one sensor for sending a signal to said microcontroller;
an Easy Format software comprising the steps of:
(a) defining m input channels for said controller unit to receive external data or signals, wherein m is an integer equal or greater than one;
(b) defining n output channels for said controller to transmit data or signals, wherein n is an integer equal or greater than one;
(c) specify x configuration state, wherein each configuration state defines the configuration of at least one input channel and/or one output channel and x is an integer equal or greater than one;
(d) specify y events to be executed by said controller unit, wherein y is an integer equal or greater than one;
(e) specify an event to be executed when the signal or data received by an input channel satisfied a predefined qualifying condition and
(f) enable an event to switch from a current configuration state to another configuration state;
said Easy Format software further comprises at least one of the following steps or characteristics:
(g) a step to specify at least one of the events to comprise of p sub-events, wherein p is an integer equal or greater than two;
(h) a step to specify an event to be triggered by a timer or timing signal;
(i) a step to structure the programming specifications into at least two fields, wherein the first field specifies the characteristics of one or more states, and the second field specifies one or more events/sub-events;
(j) a step to organize at least a part of the data specified by said steps into a table format;
(k) wherein said states and events are not necessary to be listed in sequential relationship to each other;
(l) a step to label part of a table format program for specifying the power up default condition of said user programmable toy system;
and wherein said Easy Format software is further improved to provide specific programming instructions configured to enable said user to interact with a remote computer or web site for composing a user program and for defining the play pattern of said user programmable toy system; and wherein said specific programming instructions are compatible with said configuration states and/or events format for a user of said programmable toy system to compose a program; and wherein said improved Easy Format software is further configured to compile or translate a user composed program having said specific programming instructions into codes executable by said microcontroller.

15. The user programmable toy system of claim 14 wherein said transducer is a sound transducer, and said improved Easy Format software comprises specific programming instructions configured to fetch data representing one or more sound files obtained from an external resource and for said microcontroller to process said data and generate a sound with said sound transducer.

16. The user programmable toy system of claim 14 further comprising a master toy member and two or more accessory toy members; each accessory toy comprises an element for said programmable toy to identify an accessory toy member interfaced with said master toy member; said improved Easy Format software is further configured to enable said user program to direct said microcontroller to provide a response when a predefined accessory toy member is identified.

17. The user programmable toy system of claim 14 further comprising a real time clock generator, wherein said improved Easy Format software is configured to allow said user to define a specific time of a day and to direct said microcontroller to provide a response when the time of said real time clock matches with the specific time defined by said user program.

18. The user programmable toy system of claim 14 wherein said improved Easy Format software further comprises any of the following characteristics:
(1) said improved Easy Format software comprises a specific programming instruction having a graphic representation configured for controlling a member or a feature of said programmable toy system;
(2) said improved Easy Format software comprises specific programming instructions configured for controlling a member, a function, or a feature of said programmable toy system.

19. The user programmable toy system of claim 14 wherein said user programmable toy system comprises a building kit and said improved Easy Format software is configured for said user to program an article built by said user.

20. The user programmable toy system of claim 14 further comprises any of the following elements:
(j) heat transducer;
(k) light transducer;
(l) sound transducer; and
(m) motion transducer;
(n) motion sensor;
(o) sound sensor;
(p) light sensor;
(q) a computer interface circuit; and
(r) a dialing circuit.

* * * * *